(12) United States Patent
Drobinsky et al.

(10) Patent No.: US 9,137,162 B2
(45) Date of Patent: Sep. 15, 2015

(54) NETWORK TRAFFIC ROUTING OPTIMIZATION

(71) Applicants: Alex Drobinsky, Ra'anana (IL); Isaac Eliassi, Ra'anana (IL); Or Igelka, Ramat Gan (IL)

(72) Inventors: Alex Drobinsky, Ra'anana (IL); Isaac Eliassi, Ra'anana (IL); Or Igelka, Ramat Gan (IL)

(73) Assignee: SAP SE, Walldorf (DE)

( * ) Notice: Subject to any disclaimer, the term of this patent is extended or adjusted under 35 U.S.C. 154(b) by 112 days.

(21) Appl. No.: 13/948,806

(22) Filed: Jul. 23, 2013

(65) Prior Publication Data

US 2015/0029865 A1 Jan. 29, 2015

(51) Int. Cl.
*H04L 12/801* (2013.01)
*H04L 12/721* (2013.01)

(52) U.S. Cl.
CPC .............. *H04L 47/12* (2013.01); *H04L 45/124* (2013.01); *H04L 45/123* (2013.01)

(58) Field of Classification Search
None
See application file for complete search history.

(56) References Cited

U.S. PATENT DOCUMENTS

| | | | |
|---|---|---|---|
| 5,317,566 A | 5/1994 | Joshi | |
| 6,606,303 B1 | 8/2003 | Hassel et al. | |
| 6,973,053 B1 * | 12/2005 | Passman et al. | 370/310 |
| 7,142,503 B1 | 11/2006 | Grant et al. | |
| 7,321,322 B2 | 1/2008 | Helfman et al. | |
| 7,353,537 B2 | 4/2008 | Ackerman et al. | |
| 7,616,642 B2 | 11/2009 | Anke et al. | |
| 7,699,234 B2 | 4/2010 | Neugebauer et al. | |
| 7,970,923 B2 | 6/2011 | Pedersen et al. | |
| 8,255,570 B2 | 8/2012 | Samuels et al. | |
| 8,275,829 B2 | 9/2012 | Plamondon | |
| 8,352,176 B2 | 1/2013 | Kaldewey et al. | |
| 8,396,929 B2 | 3/2013 | Helfman et al. | |
| 2006/0013230 A1 * | 1/2006 | Bosloy et al. | 370/395.42 |
| 2006/0253607 A1 | 11/2006 | Schollmeier et al. | |
| 2007/0156372 A1 | 7/2007 | Christ et al. | |
| 2007/0294028 A1 | 12/2007 | Gray et al. | |
| 2009/0046714 A1 * | 2/2009 | Holmer et al. | 370/389 |
| 2009/0109849 A1 * | 4/2009 | Wood et al. | 370/235 |
| 2009/0113412 A1 | 4/2009 | Shribman et al. | |
| 2009/0287968 A1 * | 11/2009 | Lee et al. | 714/699 |
| 2009/0292824 A1 * | 11/2009 | Marashi et al. | 709/247 |
| 2010/0023925 A1 | 1/2010 | Shribman et al. | |
| 2010/0246602 A1 * | 9/2010 | Barreto et al. | 370/466 |
| 2011/0191442 A1 * | 8/2011 | Ovsiannikov | 709/218 |
| 2011/0292933 A1 * | 12/2011 | Rodriguez Perez et al. | 370/389 |
| 2012/0011271 A1 | 1/2012 | Zhao et al. | |
| 2012/0089664 A1 | 4/2012 | Igelka | |

OTHER PUBLICATIONS

U.S. Appl. No. 13/362,206, filed Jan. 31, 2012, Or Igelka.
U.S. Appl. No. 13/905,910, filed May 30, 2013, Or Igelka.

* cited by examiner

*Primary Examiner* — Dung B Huynh
(74) *Attorney, Agent, or Firm* — Fish & Richardson P.C.

(57) ABSTRACT

The present disclosure describes methods, systems, and computer program products for providing network traffic routing optimizations. One computer-implemented method includes calculating a direct connection cost for network traffic between two points in a network, the network including one or more nodes of an accelerated application delivery (AccAD) network, calculating an AccAD connection cost for the network traffic between the two points in the network using at least one node of the AccAD network, comparing the calculated direct connection cost and the AccAD connection cost, and determining whether the direct connection cost is greater than the sum of the AccAD connection cost and a minimum cost threshold value.

27 Claims, 7 Drawing Sheets

NETWORK TRAFFIC ROUTING OPTIMIZATION

BACKGROUND

When optimizing network traffic, the usual approach is to find the shortest paths from a client to a desired server across a network topology. This shortens the time it takes for the network traffic to pass between the client and the desired server and vice versa. Data compression and caching technologies are also often used to reduce the amount of data transferred across a network and to speed up network service data request/response times, respectively. Finding a shortest path, data compression, and caching configurations are not always optimal solutions for full network resource utilization in the delivery of network services across sub-optimal routes. As a result, provided network services are underperforming and providing network services is inefficient and requires unnecessary resources; increasing a total cost of ownership.

SUMMARY

The present disclosure relates to computer-implemented methods, computer-readable media, and computer systems for providing network traffic routing optimizations One computer-implemented method includes calculating a direct connection cost for network traffic between two points in a network, the network including one or more nodes of an accelerated application delivery (AccAD) network, calculating an AccAD connection cost for the network traffic between the two points in the network using at least one node of the AccAD network, comparing the calculated direct connection cost and the AccAD connection cost, and determining whether the direct connection cost is greater than the sum of the AccAD connection cost and a minimum cost threshold value.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein connection cost can include consideration of at least one of bandwidth, latency, a network hop count, a number of network links between the two points, CPU usage, memory usage, disk space usage, a quality-of-service (QoS) value, a round trip time (RTT) value, a network congestion value, an amount of network traffic, a number of network connections, network connection interval length, a traffic type, preference tables, or physical destination.

A second aspect, combinable with any of the previous aspects, comprising routing the network traffic directly between the two network points if the direct connection cost is less than or equal to the sum of the AccAD connection cost and the minimum cost threshold value.

A third aspect, combinable with any of the previous aspects, comprising routing the network traffic between the two points in the network through the at least one node of the AccAD network if the direct connection cost is greater than the sum of the AccAD connection cost and the minimum cost threshold value.

A fourth aspect, combinable with any of the previous aspects, wherein the AccAD network is divided into at least two virtual neighborhoods.

A fifth aspect, combinable with any of the previous aspects, wherein network traffic between AccAD network nodes in a virtual neighborhood is not accelerated.

A sixth aspect, combinable with any of the previous aspects, wherein network traffic between virtual neighborhoods is accelerated.

A seventh aspect, combinable with any of the previous aspects, comprising accelerating at least one network link between the AccAD network nodes once an acceleration of another network link between any two AccAD network nodes is required.

An eighth aspect, combinable with any of the previous aspects, wherein the acceleration of any network link between the AccAD network nodes is performed regardless of the minimum cost threshold value and an association of the AccAD network nodes to one or more virtual neighborhoods.

The subject matter described in this specification can be implemented in particular implementations so as to realize one or more of the following advantages. First, one or more client front ends (CFE), server front ends (SFE) are associated with a client and server (typically geographically close), respectively, to provide efficient entry into an accelerated application delivery (AccAD) network. Second, nodes that make up the AccAD network (e.g., CFE, SFE, and a repository node) can dynamically switch roles depending upon context to provide more efficient functionality based on AccAD network operation and/or user needs. Third, AccAD node links can be discovered automatically to permit various routing optimizations to be calculated using actual AccAD network data/status parameters. Fourth, a cost is calculated to transfer network traffic/data between two nodes of the AccAD network. These costs are used, along with a minimum cost (MC) threshold value to accelerate the longest (costliest) paths of the AccAD network in order to maximize AccAD network resource utilization. The use of the MC threshold only allows the longest (costliest) paths in the network to be accelerated instead of arbitrarily accelerating a network connection between any two points in a network simply upon a cost value calculation. Adjustment of the MC thresholds permits general dynamic selective acceleration of data through the AccAD network. In other words, the selective acceleration is not necessarily set to a constant setting, but the setting may be dynamically set/modified based upon live/changing network parameters used to calculate costs. Fifth, the use of the MC threshold creates "virtual neighborhoods" in which delivering services using the AccAD network inside a delineated virtual neighborhood might actually harm the total performance of the network while between the various virtual neighborhoods service deliveries would automatically be defined based on different paths and requirements and would thus improve the total performance of the network. Sixth, the described subject matter can be used to also improve client request response times, accelerate the delivery of network services, reduce the load on different network links/paths/nodes, and/or reduce the need to cache resources/data within nodes along a network path that will likely not use the cached resources/data. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
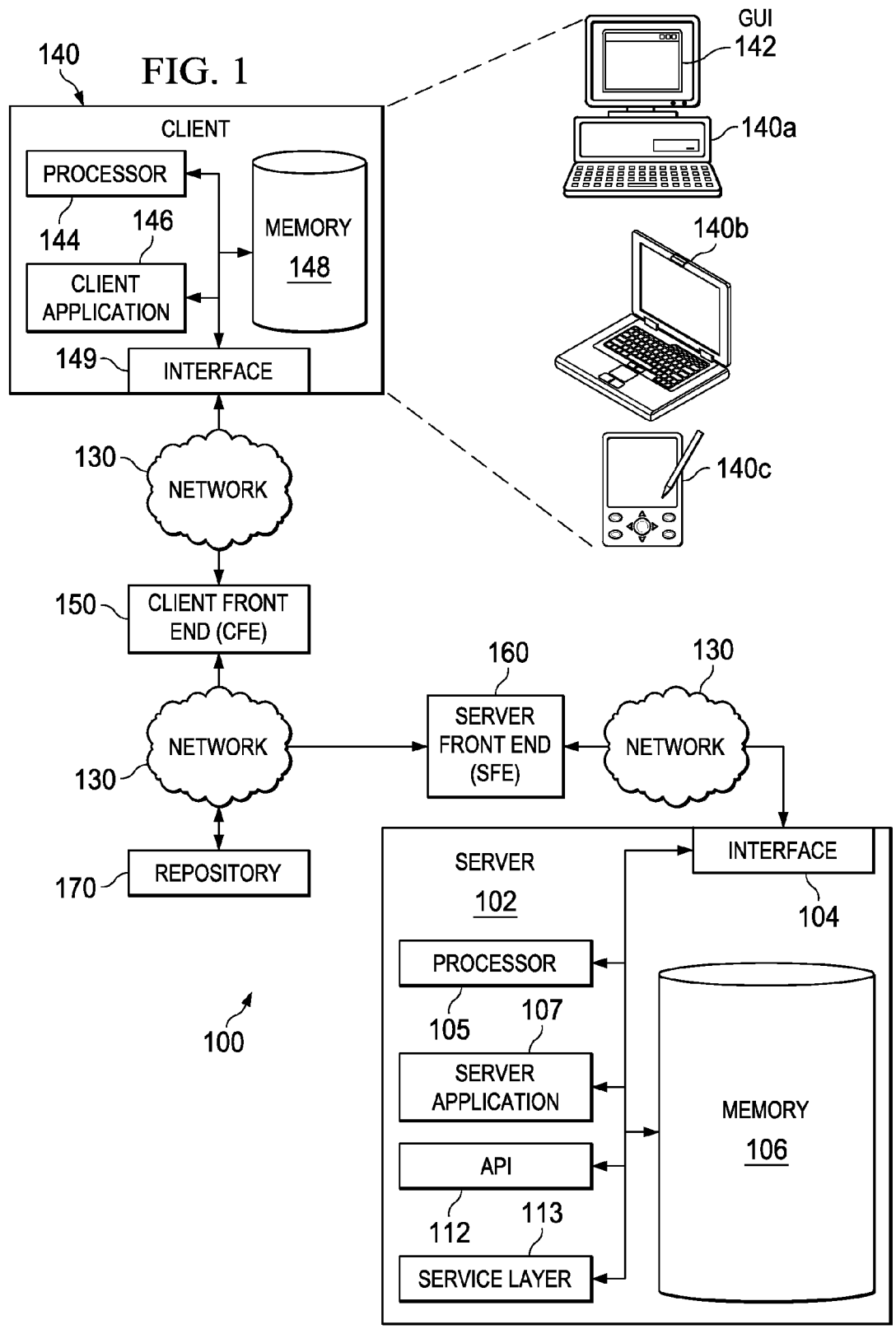
FIG. 1 is a block diagram illustrating an example distributed computing system for providing network traffic routing optimizations according to an implementation.

This disclosure generally describes computer-implemented methods, computer-program products, and systems for providing network traffic routing optimizations. The following description is presented to enable any person skilled in the art to make and use the invention, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

When optimizing network traffic, the usual approach is to find the shortest paths from a client to a desired server across a network topology. This shortens the time it takes for the network traffic to pass between the client and the desired server and vice versa. Data compression and caching technologies are also often used to reduce the amount of data transferred across a network and to speed up network service data request/response times, respectively. Finding a shortest path, data compression, and caching configurations are not always optimal solutions for full network resource utilization in the delivery of network services across sub-optimal routes. As a result, provided network services are underperforming and providing network services is inefficient and requires unnecessary resources; increasing a total cost of ownership.

The disclosure describes the use of an accelerated application delivery (AccAD) network that integrates with network clients and servers to provide network traffic routing optimizations to accelerate connections between network nodes. In general, one or more client front ends (CFE), server front ends (SFE) are associated with a client and server (typically geographically close), respectively. Additionally, one or more repositories are also associated with the one or more CFEs/SFEs. The CFEs, SFEs, and repositories are each considered AccAD "nodes" and make up the AccAD network. Further, an AccAD "node" can be an SFE, CFE, or a repository depending on context. For example, in a particular AccAD network landscape (topology), a particular node may act as a repository, while in another topology (e.g., a network failover situation), the same node may not be recognized as a repository or be dynamically configured/re-tasked from another AccAD node role to act as an additional repository, a CFE, and/or a SFE. In another example, if an AccAD node receives a request from a CFE for a service from a server near the AccAD node, the AccAD node can act as an SFE, while if the AccAD node receives a request from a client for a service which is delivered to it by a SFE, the AccAD node can act as a CFE.

The described implementation allows for automatic discovery/manual configuration of AccAD links (a network link between two AccAD nodes). The discovered/configured AccAD links (and associated network parameters) are made available for analysis to determine network traffic routing optimizations. Live network data can be used in conjunction with the AccAD links to adjust the AccAD network/provided network services on-the-fly between clients and servers.

The "cost" is calculated of both direct network connections (Cost1) between clients/servers and of some/all paths (Cost2) given particular AccAD links. Costs can be calculated, at least in part, by using a network parameter and/or combinations of network parameters, such as, but not limited to bandwidth, latency, a network hop count, a number of network links between the two points, a quality-of-service (QoS) value, a round trip time (RTT) value, a network congestion value, an amount of network traffic, a number of network connections, network connection interval length, a traffic type (e.g., is the traffic compressible, cached, etc.), preference tables, physical destination, and/or the like. For example, a larger network hop count could translate into a higher cost value, such that the calculated cost of a direct network connection between a client and server may be determined to be Cost1=5 while the cost of traversing one or more paths of the AccAD network may be determined to be Cost2=4. Note that in some implementations, the direct connection between the client and the server could be shorter geographically, but overall costlier than an AccAD network path that is geographically longer but is using faster and/or more stable network connections and/or less costly connections. In this example, traversing the AccAD network would be the optimal (accelerated) solution given the two choices and would typically be selected for efficiency, speed, etc. A network administrator can configure the network based on a perspective of "cost". For example, the network administrator can configure the network where a higher cost represents a slower connection, so a lower cost would represent a faster delivery.

Additionally, a minimum cost (MC) threshold can be introduced to add to the Cost2 value in order to adjust its value. The MC threshold can be either predefined and/or automatically decided on-the-fly according to the different live network parameters, in general, and/or in relation to two particular network points (e.g., a client and server). In this case, only if (Cost1)>(Cost2+some MC threshold) then the communication between two points is accelerated through the optimal route provided by the AccAD network. In some implementations, the threshold is used to permit acceleration only of the most costly paths through the AccAD network while preventing other paths through the AccAD network from being accelerated. In other words, the higher the MC threshold, fewer less-costly network paths will be accelerated through the AccAD network. The use of the MC threshold also creates "virtual neighborhoods" (see FIG. 6B for additional discussion of virtual neighborhoods) in which delivering services using the AccAD network inside a delineated virtual neighborhood would actually harm the total performance of the network because (Cost1)<=(Cost2+some MC threshold) while between the various virtual neighborhoods service deliveries would automatically be defined based on different paths and requirements. In some implementations, each virtual neighborhood can be associated with a unique MC threshold value. In some implementations, one or more virtual neighborhoods can share an associated MC threshold value. The use of the MC threshold forces searches to focus on the longest (costliest) paths in the network and only allows them to be accelerated instead of arbitrarily accelerating a network connection between any two points in a network simply upon a cost value calculation. Adjustment of the MC thresholds permits general dynamic selective acceleration of data through the AccAD network.

FIG. 1 is a block diagram illustrating an example distributed computing system (EDCS) 100 for providing network traffic routing optimizations according to an implementation. The illustrated EDCS 100 includes or is communicably coupled with a server 102, a client 140, a client front end (CFE) 150, a server front end (SFE) 160, and a repository 170 that communicate across a network 130. In some implementations, one or more components of the EDCS 100 may be configured to operate within a cloud-computing-based environment and is advantageous where acceleration of cloud services is beneficial. For example, acceleration can be allowed between different determined services in order to speed up communications between the different services as opposed to just accelerating network traffic from a server in the cloud environment to a client's connection point to the network.

At a high level, the server 102 is an electronic computing device operable to receive, transmit, process, store, or manage data and information associated with the EDCS 100. According to some implementations, server 102 may also include or be communicably coupled with an e-mail server, a web server, a caching server, a streaming data server, a business intelligence (BI) server, and/or other server. The following described computer-implemented methods, computer-readable media, computer systems, and components of the example distributed computer system 100 provide network traffic routing optimizations using, among other things, an AccAD application/AccAD data (not illustrated) associated with CFEs/SFEs, a repository application/repository data (not illustrated) associated with a repository, and one or more clients and servers.

In general, the server 102 is a server that stores and/or executes one or more server applications 107 and acts as a supplier of network services. A network service is a data storage, manipulation, presentation, communication or other capability which is often implemented using a client-server or peer-to-peer architecture based on network protocols running at the application layer of a network. Each network service is usually provided by a server component running on one or more computers (often a dedicated server computer offering one or more services) and accessed using a network by client components running on other client devices. However, in some implementations, the described client and server components can both be run on the same computer, sometimes simultaneously. This dual nature sometimes requires interfacing network components to switch roles as a client and/or server.

Network services can include, for example, a domain name system (DNS), authentication servers, an NTP server, a DHCP server, an FTP server, search systems, streaming data (e.g., audio/video), file storage/transmission, and the like. The server 102 can also interact with user requests/responses sent by clients 140 within and communicably coupled to the illustrated EDCS 100. In some implementations, the one or more server applications 107 represent one or more web-based applications accessed and executed by the client 140, CFE 150, SFE 160, and/or repository 170 using the network 130, or a user directly accessing the server 102 to perform the programmed tasks or operations of a particular server application 107.

The server 102 is responsible for receiving requests using the network 130 from one or more client applications 146 associated with the client 140 of the EDCS 100 and responding to the received requests by processing the said requests in the server application 107. In addition to requests received from the client 140, requests may also be sent to the server 102 from internal users, external or third-parties, other automated applications, as well as any other appropriate entities, individuals, systems, or computers, including a CFE 150, a SFE 160, and/or a repository 170. In some implementations, various requests can be sent directly to server 102 from a user accessing server 102 directly.

In some implementations, any and/or all the components of the server 102, both hardware and/or software, may interface with each other and/or the interface 104 (described below) using an application programming interface (API) 112 and/or a service layer 113. The API 112 may include specifications for routines, data structures, and object classes. The API 112 may be either computer-language independent or dependent and refer to a complete interface, a single function, or even a set of APIs. The service layer 113 provides software services to the EDCS 100. The functionality of the server 102 may be accessible for all service consumers using this service layer. Software services, such as those provided by the service layer 113, provide reusable, defined business functionalities through a defined interface. For example, the interface may be software written in JAVA, C++, or other suitable language providing data in extensible markup language (XML) format or other suitable format.

While illustrated as an integrated component of the server 102 in the EDCS 100, alternative implementations may illustrate the API 112 and/or the service layer 113 as stand-alone components in relation to other components of the EDCS 100. Moreover, any or all parts of the API 112 and/or the service layer 113 may be implemented as child or sub-modules of another software module, enterprise application, or hardware module without departing from the scope of this disclosure. For example, the API 112 could be integrated into the server application 107.

The server 102 includes an interface 104. Although illustrated as a single interface 104 in FIG. 1, two or more interfaces 104 may be used according to particular needs, desires, or particular implementations of the EDCS 100. The interface 104 is used by the server 102 for communicating with other systems in a distributed environment—including within the EDCS 100—connected to the network 130; for example, the client 140, CFE 150, SFE 160, and/or repository 170 as well as other systems communicably coupled to the network 130 (whether illustrated or not). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated EDCS 100.

The server 102 includes a processor 105. Although illustrated as a single processor 105 in FIG. 1, two or more processors may be used according to particular needs, desires, or particular implementations of the EDCS 100. Generally, the processor 105 executes instructions and manipulates data to perform the operations of the server 102. Specifically, the processor 105 executes the functionality required to provide network traffic routing optimizations.

The server 102 also includes a memory 106 that holds data for the server 102, client 140, and/or other components of the EDCS 100. Although illustrated as a single memory 106 in FIG. 1, two or more memories may be used according to particular needs, desires, or particular implementations of the EDCS 100. While memory 106 is illustrated as an integral component of the server 102, in alternative implementations, memory 106 can be external to the server 102 and/or the EDCS 100.

The server application 107 can be considered a content provider that can include, for example, applications and data on a server and/or external services, business applications, business application servers, databases, RSS feeds, document servers, web servers, streaming servers, caching servers, or other suitable content sources. In some implementations, a particular server application 107 can use internal/external server application data (not illustrated) to provide content to the client 140 and/or other appropriate components of the EDCS 100. The server application 107 also allows the client 140 to request, view, execute, create, edit, delete, and/or consume content from server 102.

Once a particular server application 107 is launched, the particular server application 107 can be used, for example by a client 140 or other component of the EDCS 100 (e.g., a CFE 150, a SFE 160, and/or a repository 170), to interactively process a task, event, or other information/content associated with the server 102. In some implementations, the server application 107 may be a network-based, web-based, and/or other suitable application consistent with this disclosure. For example, a particular server application 107 may receive a search request from a client 140 browser. The server application 107 can initiate a search process based on the received search request and send received search results back to the requesting client 140.

In some implementations, a particular server application 107 may operate in response to and in connection with at least one request received from other server applications 107, other components (e.g., software and/or hardware modules) associated with another server 102, and/or other components of the EDCS 100 (whether illustrated or not). In some implementations, the server application 107 can be accessed and executed in a cloud-based computing environment using the network 130. In some implementations, a portion of a particular server application 107 may be a web service associated with the server application 107 that is remotely called, while another portion of the server application 107 may be an interface object or agent bundled for processing at a remote client 140. Moreover, any or all of a particular server application 107 may be a child or sub-module of another software module or enterprise application (not illustrated) without departing from the scope of this disclosure. Still further, portions of the particular server application 107 may be executed or accessed by a user working directly at the server 102, as well as remotely at a corresponding client 140. In some implementations, the server 102 or any suitable component of server 102 or the EDCS 100 can execute the server application 107.

The client 140 (e.g., 140*a*-140*c*) may be any computing device operable to connect to or communicate with at least the server 102 using the network 130 and that acts as a consumer of network services. In general, the client 140 comprises an electronic computing device operable to receive, transmit, process, and store any appropriate data associated with the EDCS 100, for example, the server application 107, GUIs, utilities/tools, and the like. More particularly, among other things, the client 140 can generate content supply requests and content governance administrative requests with respect to the server 102. The client typically includes a processor 144, a client application 146, a memory 148, and/or an interface 149.

The client application 146 is any type of application that allows the client 140 to navigate to/from, request, view, create, edit, delete, administer, and/or manipulate content associated with the server 102. In some implementations, the client application 146 can be and/or include a web browser. In some implementations, the client application 146 can use parameters, metadata, and other information received at launch to access a particular set of data from the server 102 and/or other components of the EDCS 100. Once a particular client application 146 is launched, a user may interactively process a task, event, or other information associated with the server 102 and/or other components of the EDCS 100. For example, the client application 146 can generate and transmit a search request to the server 102. Further, although illustrated as a single client application 146, the client application 146 may be implemented as multiple client applications in the client 140.

The interface 149 is used by the client 140 for communicating with other computing systems in a distributed computing system environment, including within the EDCS 100, using network 130. For example, the client 140 uses the interface to communicate with a server 102, a CFE 150, a SFE 160, as well as other systems (not illustrated) that can be communicably coupled to the network 130. The interface 149 may be consistent with the above-described interface 104 of the server 102 or other interfaces within the EDCS 100. The processor 144 may be consistent with the above-described processor 105 of the server 102 or other processors within the EDCS 100. Specifically, the processor 144 executes instructions and manipulates data to perform the operations of the client 140, including the functionality required to send requests to the server 102 and to receive and process responses from the server 102.

The memory 148 typically stores objects and/or data associated with the purposes of the client 140 but may also be consistent with the above-described memory 106 of the server 102 or other memories within the EDCS 100 and be used to store data similar to that stored in the other memories of the EDCS 100 for purposes such as backup, caching, and the like.

Further, the illustrated client 140 includes a GUI 142 that interfaces with at least a portion of the EDCS 100 for any suitable purpose. For example, the GUI 142 may be used to view data associated with the client 140, the server 102, or any other component of the EDCS 100. In particular, in some implementations, the client application 146 may act as a GUI interface for the server application 107, other components of server 102, and/or other components of the EDCS 100 (whether illustrated or not) including the CFE 150, SFE 160, and/or repository 170. For example, the GUI 142 can be used, in some implementations, to configure or maintain an AccAD network, configure/maintain a repository 170, and/or configure/maintain a CFE 150/SFE 160.

There may be any number of clients 140 associated with, or external to, the EDCS 100. For example, while the illustrated EDCS 100 includes one client 140 communicably coupled to the server 102 using network 130, alternative implementations of the EDCS 100 may include any number of clients 140 suitable to the purposes of the EDCS 100. Additionally, there may also be one or more additional clients 140 external to the illustrated portion of the EDCS 100 that are capable of interacting with the EDCS 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 (example configurations illustrated as 140a-140c) is intended to encompass any computing device such as a desktop computer, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the server 102 or the client 140 itself, including digital data, visual and/or audio information, or a GUI 142, as illustrated specifically with respect to the client 140a.

The client front end (CFE) 150 is an appliance (e.g., a computer) which can act both as a client (e.g., a client 140), by consuming network services from SFEs 160, and as a server, by providing clients with the network services it consumes. The CFE 150 acts as a type of a reflector of the network services consumed and is typically placed geographically close to a particular client 140 and connected to the client 140 over network 130. In other words, the client 140 would receive the same network service delivery both when accessing the delivered services through the CFE 150 and when directly accessing the server 102 providing the network service (apart from performance differences). The SFE-CFE structure passes the network service from the server 102 to client 140, such that they "reflect" the server 102 to the client 140 through them (e.g., server 102→SFE 160 (the "server-side")→CFE 150→client 140 (the client-side)), in such a manner that the client 140 sees the same thing when either communicating with the server 102 directly or when accessing the server 102 through the CFE 150. In some implementations, a single CFE 150 can consume network services from several SFEs 160. In some implementations, the CFE 150 can be similar in structure (software and/or hardware) to the server 102 and/or client 140, with more or less software and/or hardware components according to particular needs, desires, or particular implementations of the EDCS 100. As described above, a CFE 150 is considered an AccAD node depending on context. In some implementations, the CFE 150 can be re-tasked for various reasons to act as a SFE 160 and/or a repository. For example, a CFE 150 may switch to act as a SFE 160 when it is required to deliver network services which are provided from a server1 (geographically proximate to a client1) to a client2 (geographically proximate to a server2) through a CFE 150 proximate to server2. In this example, the latter CFE 150 could be called on to interact with either client2 and/or server2 and could take on a different (or a dual) role.

The server front end (SFE) 160 is an appliance (e.g., a computer) which can act both as a client (e.g., a client 140), consuming network services from servers (e.g., a server 102), and on the other hand as a server, providing CFEs 150 with the network services it consumes. The SFE 160 acts as a type of a reflector (similar to the discussion above related to the CFE 150) of the network services consumed and is typically placed geographically close to one or more servers 102 and connected to the one or more servers 102 over network 130. In the case of the SFE 160, the SFE 160 transparently passes a network service from the server 102 to a CFE 150. By "transparent," it is to be understood that communications between the SFE 160 and the CFE 150 can, in some implementations, be uniquely altered (e.g., compressed, cached, accelerated and so on). However, the CFE 150 does reflect network services from the server 102 to the client 140 through SFE 160 and not from the SFE 160, as the client 140 receives network services through the AccAD network as-if the client 140 would have directly communicated with the server 102. In some implementations, the SFE 160 can be similar in structure (software and/or hardware) to the server 102 and/or client 140, with more or less software and/or hardware components according to particular needs, desires, or particular implementations of the EDCS 100. As described above, a SFE 160 is considered an AccAD node depending on context. In some implementations, the SFE 160 can be re-tasked for various reasons to act as a CFE 150 and/or a repository. For example, a SFE 160 may switch to act as a CFE 150 when it is required to deliver network services which are provided from a server1 (geographically proximate to a client1) to a client2 (geographically proximate to a server2) through a SFE 160 proximate to server1. In this example, the latter SFE 160 could be called on to interact with either client1 and/or server1 and could take on a different (or a dual) role.

In some implementations, a CFE 150/SFE 160 can switch roles and operate as a SFE 160/CFE 150, respectively. See FIG. 2B for an example.

The repository 170 provides functionality to consolidate configurations of delivered network services and to provide SFEs 160 and/or CFEs 150 with repository data (not illustrated) about network services (e.g., types, resource usage, requirements, etc.), the network itself, clients 140, and/or servers 102. In some implementations, the repository 170 contains a repository application (not illustrated) capable of providing repository functionality and to also act as a host for installable resources (also repository data), such as upgrade resources (e.g. scripts, binaries, RED HAT PACKAGE MANAGER files (RPMs), MICROSOFT installer files (MSIs), installation packages, etc.). In some implementations, the repository application can use/provide live network data to dynamically monitor the AccAD network (or interface with other repository applications and/or AccAD applications to collectively monitor the AccAD network) in order to adjust provided network services between CFEs 150 and/or SFEs 160. In some implementations, the live network data can be collected in and/or used by each AccAD node. The AccAD nodes can also transmit the live network data among themselves as well as to and from the repository 170 and any other suitable component of the EDCS 100.

In some implementations, the CFE 150, SFE 160, and/or repository 170 can include one or more instances of an AccAD application and/or AccAD data (neither illustrated). The AccAD application can be used to configure/maintain an AccAD network, neighborhood, and/or topology. For example, the AccAD application can provide functionality accessible by a client 140 to automatically discover/manually configure of AccAD links in a particular AccAD network.

In some implementations, the AccAD application can use live network data to dynamically monitor the AccAD network (or interface with other AccAD applications and/or a repository—described below—to collectively monitor the AccAD network) in order to adjust provided network services between CFEs 150, SFEs 160, and/or repository 170. For example, the AccAD application can redirect network traffic based on a determination that a more efficient network path is not available, a network connection is no longer available, and the like.

The AccAD application can also execute within an AccAD node to support operation of AccAD functionality, including determining the operating role of an AccAD node (e.g. as a CFE 150, SFE 160, and/or a repository 170). For example, the AccAD application can dynamically determine that a SFE 160 should be operating as a CFE 150 and request that the SFE 160 modify its role in the AccAD network. In another example, in some implementations, the AccAD node can act both as a CFE 150 and as a SFE 160 at the same time depending on the specific connection's requirement.

In some implementations, the AccAD application can generate one or more service delivery configurations based on a particular content type being routed through the network, the source and/or destination of the content, and other parameters, including specific fine-tunings of a delivery's configurations suited according to the particular content and/or other network parameters. Specific content types and/or connections and/or specific protocols can also be manually/automatically defined by the AccAD application to be ignored/not accelerated. For example, search requests can be specified to not be accelerated by the AccAD network. Service delivery configurations may include adjusting data quality, acceleration levels, and the like to preserve data integrity/quality. In some implementations, the AccAD application can provide a user-accessible GUI to generate, remove, review, edit, propose, and/or select service delivery configurations/modifications.

In some implementations, the AccAD application can provide functionality to suggest AccAD network modifications, including providing a user-accessible GUI to generate, remove, review, edit, propose, and/or select modifications to the AccAD network. For example, a user can be notified using a GUI that a recommendation has been made to add a SFE 160 to permit more efficient access to one or more servers. The user can choose to approve/deny the suggestion, edit the suggestion, review additional details regarding the suggestion (projected cost, performance/cost improvements, etc.), forward the suggestion to someone else for review, and the like.

In some implementations, routes for traffic (including specific types of traffic) can be prioritized within the AccAD network by the AccAD application. Prioritization can be based upon administrator requirements, dynamic determinations based on network status, AccAD network usage, and the like. Traffic routing can help save costs and/or improve the performance of network topologies in that, for particular content types, a more limited set and/or particular set of necessary resources can be specified which can save usage costs and improve performance. For example, for low priority traffic, particular low-cost routes can be prioritized/specified for that type of traffic to save money. As another example, data intensive traffic (video streaming), can be prioritized through network routes that are just sufficient performance-wise to meet demand without wasting additional cost for unnecessary performance. In some implementations, the AccAD application can provide a user-accessible GUI to generate, remove, review, edit, propose, and/or select route prioritizations/routing.

In some implementations, the AccAD application can be used to determine a "best" topology (according to cost/performance requirements). The determination can be made for comparison with other options and/or a real AccAD network configuration before any actual modifications are made in the AccAD network's topology (e.g., in a dynamic "sandbox"/simulation type of environment). The dynamic simulation can leverage actual AccAD network parameters in current states (e.g., cost, bandwidth status, number of users, etc.). An administrator can vary parameters, including the MC threshold to dynamically build/change virtual neighborhoods to analyze effects on overall AccAD network performance and, if desired, change the topology of an AccAD network on-the-fly. In some implementations, the AccAD application can provide a user-accessible GUI to generate, remove, review, edit, propose, and/or select topologies.

AccAD data can be used by an AccAD application, AccAD node, and/or appropriate component of the EDCS 100 and can include network topologies/configurations, network identifications, geographic locations, AccAD virtual neighborhood configurations (described below), MC threshold data, link cost calculations, status data, configuration data, network/AccAD link (described below) data, customer information, security information, user profiles, network timing data (e.g., hops, round trip times, etc.), service information, and the like. The AccAD data can be generated, stored, and/or converted from/into any suitable format or form, for example, binary, text, numerical, a database file, a flat file, an XML file, or the like. In some implementations, the AccAD data can be accessed by any suitable component of the EDCS 100, for example, the client application 146. In some implementations, the AccAD data can be updated regularly or at a particular time based on underlying processes and/or data/content objects. The AccAD data can be an integral component of the memory 106. In alternative implementations, the AccAD data can be wholly or partially external to the memory 106 (e.g., stored in memory 148 or other available memory of the EDCS 100 such as memories of the CFE 150, SFE 160, and/or repository 170) and/or be separated into both external AccAD data and internal AccAD data as long as these are accessible using network 130. In other implementations, the AccAD data can be shared among multiple AccAD nodes.

Figure 2A:
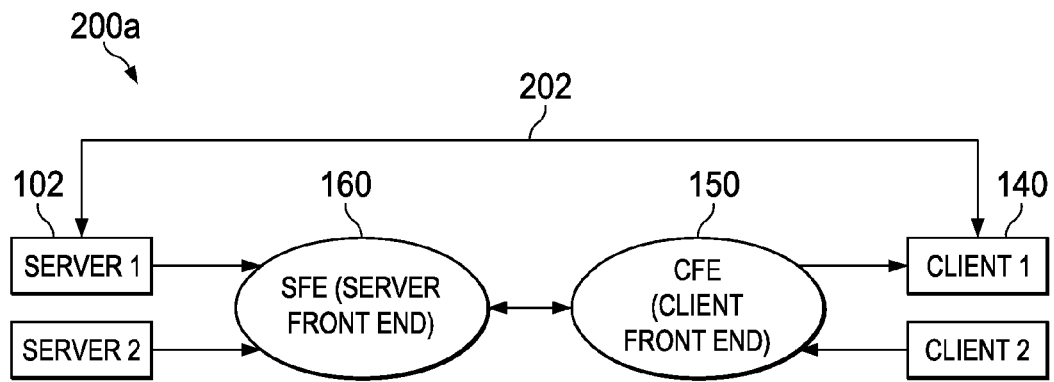
FIGS. 2A & 2B are block diagrams illustrating network/accelerated application delivery (AccAD) network traffic delivery according to an implementation.
Figure 2B:
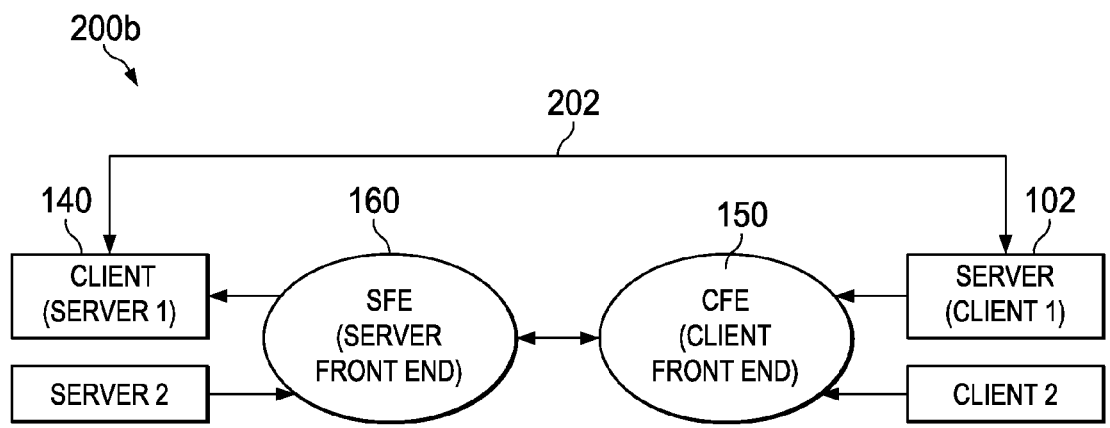

FIGS. 2A & 2B are block diagrams 200*a* & 200*b* illustrating network/AccAD network traffic delivery, respectively, according to an implementation. FIG. 2A illustrates a basic network topology according to an implementation. The basic network topology includes two servers 102 (server1 and server2), two clients 140 (client1 and client2), CFE 150, and SFE 160. As shown, client1 140 can consume a network service by accessing CFE 150 in the network, which in turn accesses SFE 160 to consume the network service, which in turn access, for example, server1 102 to supply the network service. The network service is passed back through the network from server1 102 to the requesting client(s) 140. Note that in this illustration, a direct network connection 202 also exists between the client1 140 and server1 102. In this example, it could be that Cost1 (the direct connection)> (Cost2+some MC threshold) as described above. In this case, the connection is accelerated through the AccAD network including the CFE 150 and the SFE 160. In some implementations, both clients can simultaneously access the CFE 150 (and vice versa) and the SFE 160 can simultaneously access both servers (and vice versa). In some implementations, a CFE 150 can access multiple SFE's 160 simultaneously.

Turning now to FIG. 2B, FIG. 2B illustrates a reversed basic network topology network delivery configuration according to an implementation. Here, server1 102 of FIG. 2A has switched roles to act as a client 140, while the client1 140 has switched roles to act as a server 102. Note that the CFE 150 and the SFE 160 have not switched formal named roles in this example but are still able to provide appropriate services for the current client/server configuration (even operating as both a CFE 150 and a SFE 160). In some implementations, the CFE 150 and/or the SFE 160 can switch formal named roles.

Figure 3:
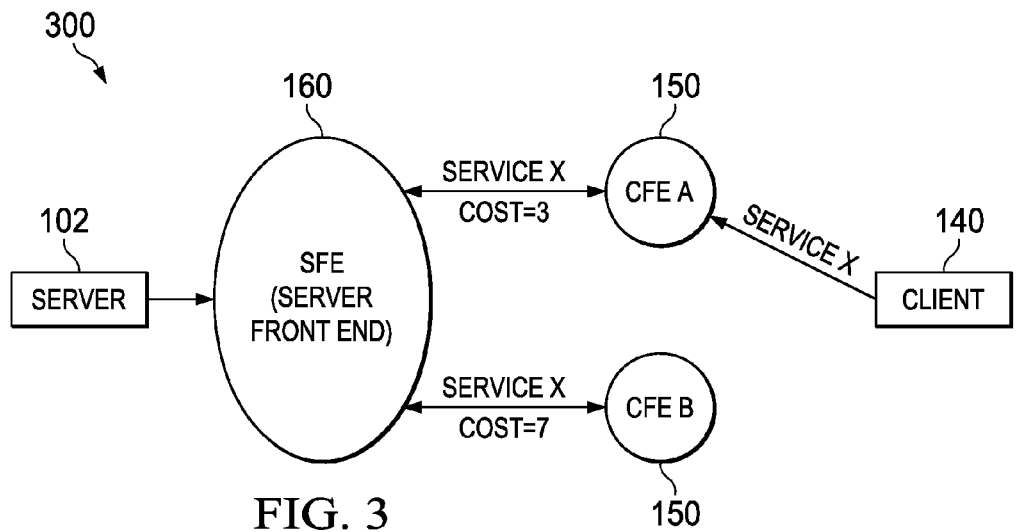
FIG. 3 is a block diagram illustrating redirecting AccAD network traffic to a more optimal route according to an implementation.

FIG. 3 is a block diagram 300 illustrating redirecting AccAD network traffic to a more optimal route according to an implementation. As illustrated, the cost between CFE A 150 and SFE 150 is 3. The cost between CFE B 150 and SFE 160 is 7. Here, a request for service X from client 140 to CFE B 150 is redirected by CFE B 150 to CFE A 150 to take advantage of the reduced cost between CFE A 150 and SFE 150.

At least two redirection methods are envisioned:

1. Ongoing intervention—the AccAD node forwards the requestor's request to the target node (e.g., server 102) to which it redirects and then forwards the response from the target node to the requestor. In FIG. 3, CFE B 150 would receive a request for service X from the client 140 and forward it to CFE A 150 and then receive a response from CFE A 150 to forward back to the client 140. A benefit of the ongoing intervention approach is to allow the redirecting AccAD node to analyze/manipulate/report (among other things) data prior to redirection and/or in the process of it. In some implementations, CFE B 150 could seamlessly/transparently (from the perspective of the client) handle forwarding of the service request to the SFE 160 if, for example, the route from the CFE A 150 to server 102 has failed or the route from CFE B 150 to CFE A 150 has failed. This method provides a built-in backup functionality for the delivery of the service from the server to the client through the AccAD network, transparent to the client, which increases the availability of the delivered service to the client by increasing the amount of available routes through which the service may be delivered to the client, while CFE B 150 proxies these routes for the client, and it does so in a manner which may even be relatively less costly and more efficient.

2. Single intervention—the AccAD node receives a request from the requestor and instructs the requestor to go directly to a desired target node without forwarding the client's request and/or receiving a response to forward back to the client. In FIG. 3, CFE B 150 would receive a request for service X from the client 140 and in response would instruct client 140 to request service X from CFE A 150 directly instead of requesting it from and/or through CFE B 150. The benefit of the single intervention approach (apart from the initial communication between the client 140 and the AccAD network) is to save network hops and reduce unnecessary load on CFE B 150. The type of redirection method is, in some implementations, user/administrator configurable and/or automatically/dynamically configured. In some implementations a default redirection method can be set and be overridden if desired and/or based on various network or other parameters. In some implementations, each AccAD node can choose the redirection method suitable to its current situation, role, resources usage, etc. and/or perform different redirection methods simultaneously based on request types, connections, etc.

In some implementations, each AccAD node can publish the cost from it to each of its neighbors, and in conjunction with the regular routing tables, each AccAD node would be able to calculate the best route for it considering the costs of the different available paths (e.g. by using Dijkstra's algorithm or other suitable algorithm for shortest paths calculation). Furthermore, each AccAD node would "know" whether its communication with another AccAD node in the network should be accelerated by AccAD or not, and thus would be able to request this service from AccAD or go directly to the wanted destination node respectively. Further, each AccAD node can determine whether it would be more advantageous for traffic to be redirected to another AccAD node or directly to another network node/AccAD node. Here, CFE B 150 redirected the request for service X to CFE A 150 due to a determination it would be optimal for CFE A 150 to receive the request for service X and to accelerate it through the AccAD network to SFE 160.

Figure 4:
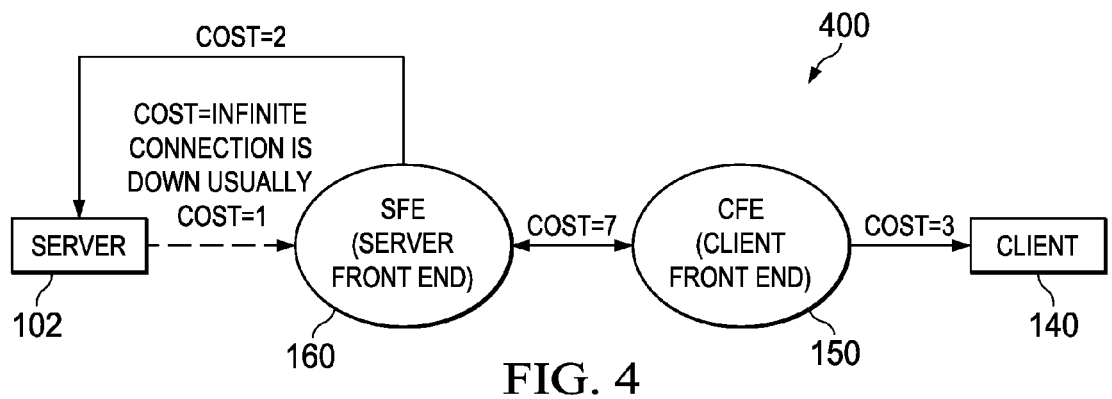
FIG. 4 is a block diagram illustrating, according to an implementation, a server front end (SFE) redirecting traffic to an associated server as its network connection to the associated server is unavailable.

FIG. 4 is a block diagram 400 illustrating, according to an implementation, a SFE redirecting network traffic directly to an associated server as its network connection to the associated server is unavailable. Here, as the connection (usual cost=1) between SFE 160 and server 102 is down, SFE 160 redirects network traffic using the ongoing intervention method described in FIG. 3 (cost=2) to the server 102 to bypass the unavailable connection. It must be noted that while the connection from the SFE 160 to the server 102 may be down, the server may still be available (e.g., the SFE 160 failed to create a new socket to communicate with the server 102) while the SFE 160 may be able to forward traffic in lieu of opening a socket first (which might add an unnecessary cost increase) in order to route the traffic through the SFE 160. In the case where the server is down, the SFE 160 may try to redirect traffic to the server but will fail to do so since the server is down, and thus it would then report the failure back up through the network chain (e.g., the CFE 150 might try to redirect as well to the server 102 before reporting an error to the client 140). While in the example the total cost changes from a usual cost=11 to a cost=12, an infinite cost determination due to a down connection between the SFE 160 and server 102 results in a decision by the SFE 160 to redirect the network traffic even with a slight cost increase. In another implementation, the SFE 160 can instruct the CFE 150 and/or client 140 to perform a single intervention redirection method as described in FIG. 3.

Figure 5:
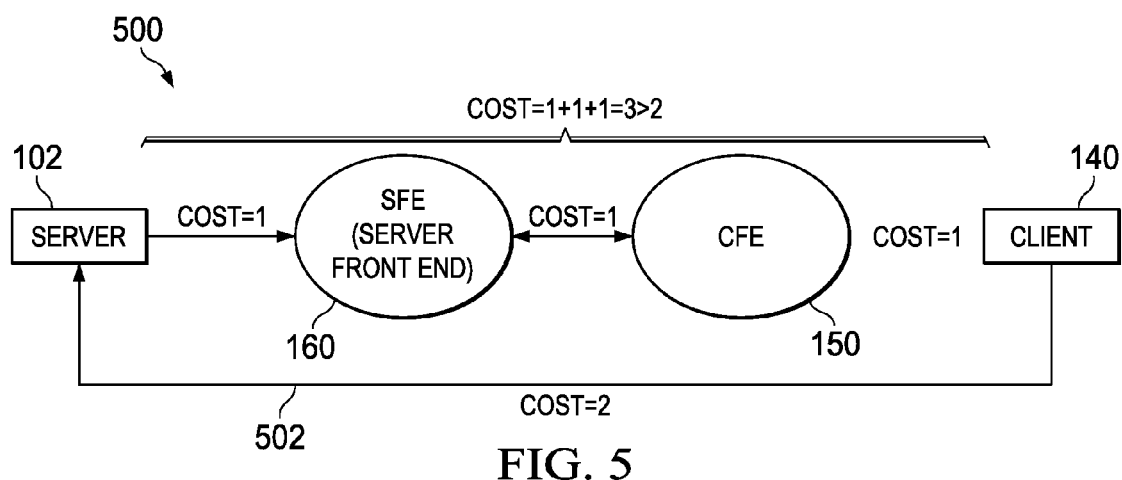
FIG. 5 is a block diagram illustrating, according to an implementation, a client front end (CFE) redirecting AccAD network traffic from a client directly to a server.

FIG. 5 is a block diagram 500 illustrating, according to an implementation, a client front end (CFE) redirecting AccAD network traffic from a client directly to a server. Here, a determined Cost2=3 for network traffic to traverse client 140→CFE 150→SFE 160→server 102 has been determined to be more than the Cost1=2 of a direct network connection 502 between the client 140 and the server 102. It should be noted that, in this case, even if the CFE 150 performs an ongoing intervention redirection, then a total cost of (1 (client→CFE)+2 (CFE→server))=3 is still equal to the cost of going through the AccAD path, and thus, in such a case, the client 140 would also be redirected directly to the server 102 (without a need to even consider a MC threshold). This situation could have occurred due to changing network connection conditions along the Cost2 path or related to the Cost1 direct connection. Here, the CFE 150 redirects the network traffic directly to the server 102.

Figure 6A:
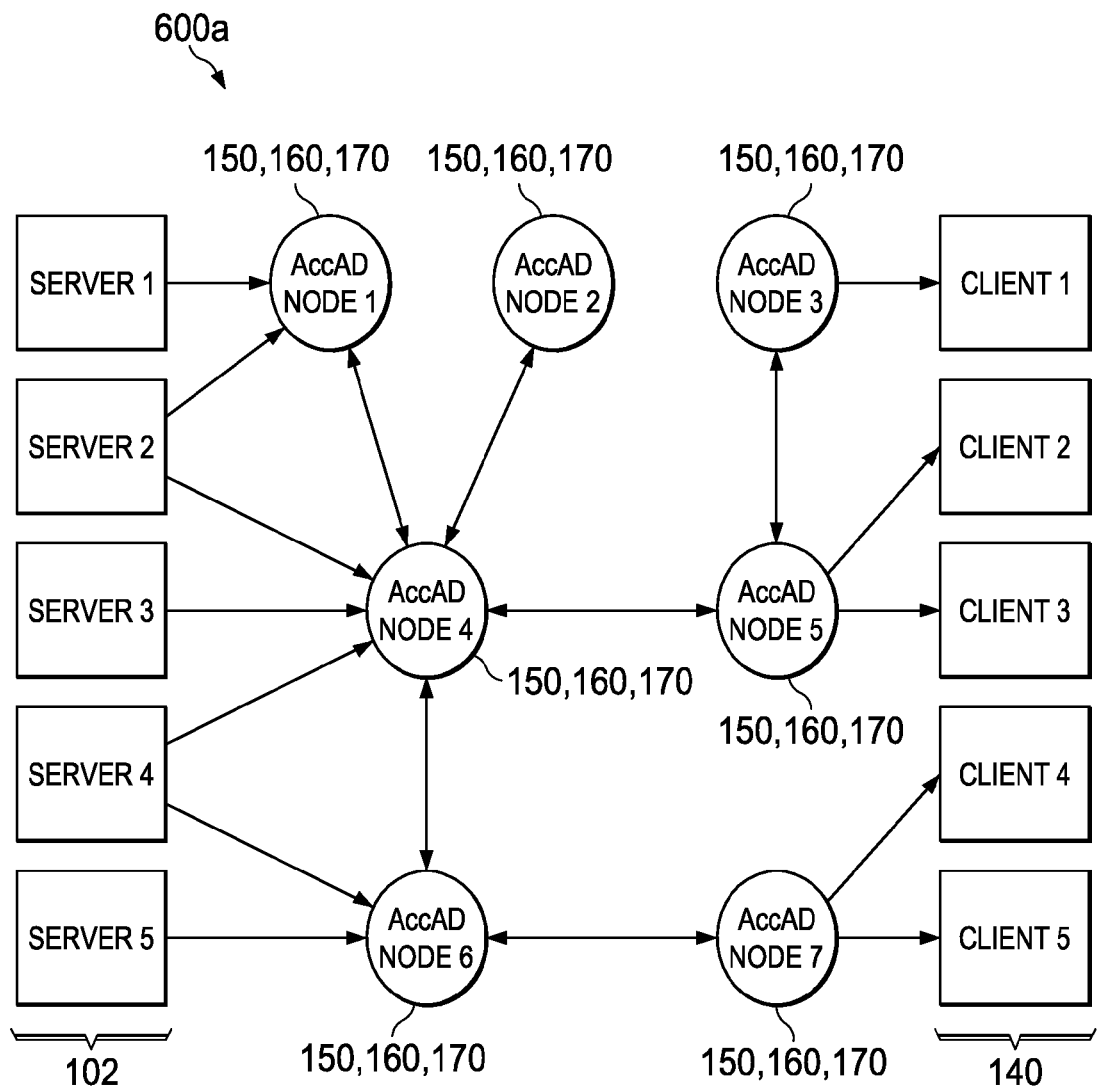
FIG. 6A is a block diagram illustrating an example AccAD topology according to an implementation.

FIG. 6A is a block diagram 600a illustrating an example AccAD topology according to an implementation. As illustrated, there are five servers (server1-server5), seven AccAD nodes (node1-node7), and five clients (client1-client5). Servers can supply network services to one or more AccAD nodes (e.g., server1 has a connection with node1 (e.g., a SFE) while server2 has connections with node1 and node4 (e.g., a SFE)).

Likewise AccAD nodes can connect to one or more AccAD nodes (e.g., node1 has a connection only with node4 while node4 has connections with node2 (e.g., a CFE 150, SFE 160, and/or repository 170), node5 (e.g., a CFE), and node6 (e.g., a SFE)). The AccAD nodes can also deliver network services to one or more clients (e.g., node3 is connected to client1 while node5 is connected to client2 and client3). The arrows are directional and represent an ability to pass the requested network service in the arrow's direction. A possible initial configuration of each AccAD node could be as follows: node1, node4, and node6 configured as SFEs 160 as they are connected to servers; node3, node5, and node7 configured as CFEs 150 as they are connected to clients; node2, free to be configured as a CFE 150 and/or a SFE 160 and/or a repository 170 depending upon connections in the illustrated AccAD network.

Figure 6B:
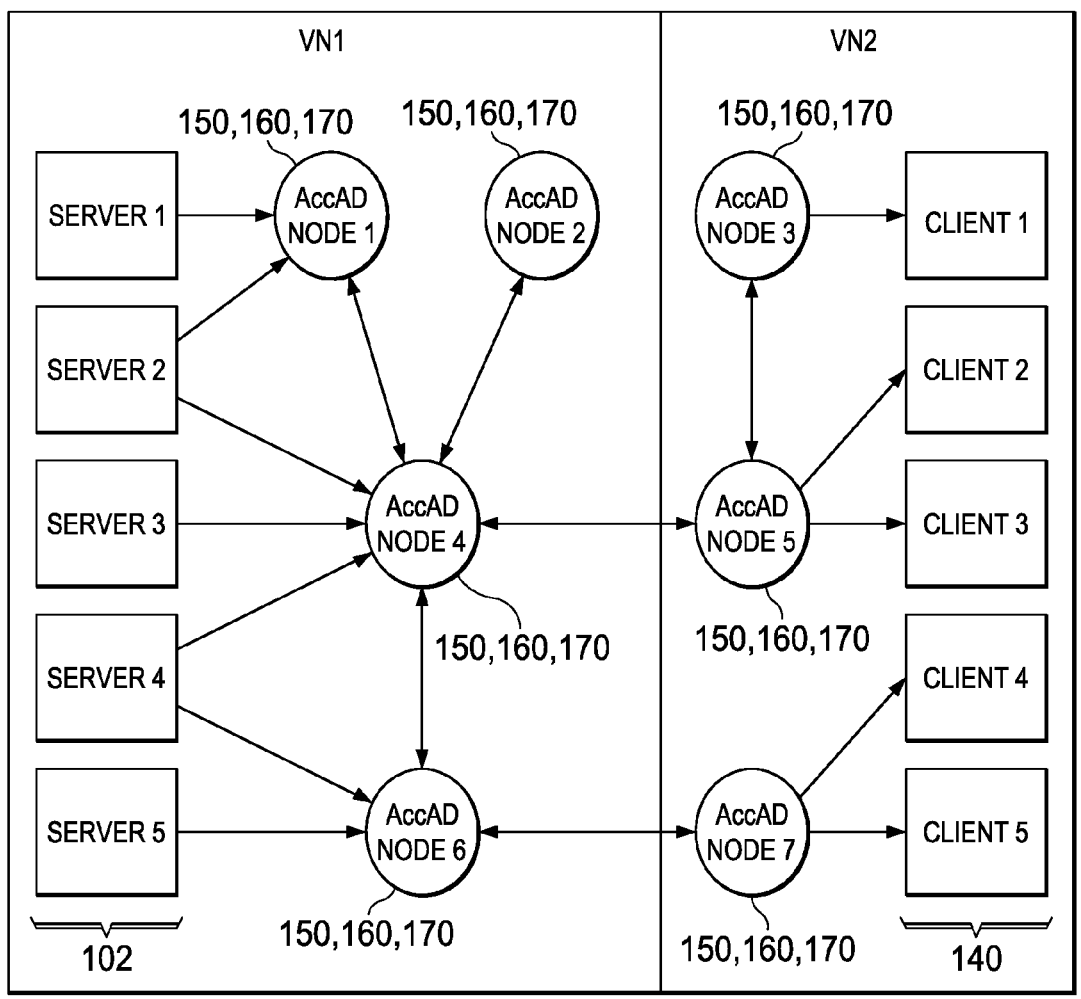
FIG. 6B is a block diagram illustrating an example AccAD topology split into virtual neighborhoods according to an implementation.

FIG. 6B is a block diagram 600b illustrating an example AccAD topology split into virtual neighborhoods according to an implementation. Some components of FIG. 6B are labeled similarly to FIG. 6A. In FIG. 6B, the use of the above-described MC threshold creates two virtual neighborhoods (VN1 and VN2) in which delivering services using the AccAD network inside a delineated virtual neighborhood would actually harm the total performance of the network because (Cost1)<=(Cost2+some MC threshold) while AccAD acceleration of network services between the various virtual neighborhoods would improve the performance of the network. Although illustrated as divided into two virtual networks, the network can be divided into more than two virtual networks. The use of the MC threshold forces searches to focus on the longest (costliest) paths in the network and only allows them to be accelerated instead of arbitrarily accelerating a network connection between any two points in a network simply upon a cost value calculation. Adjustment of the MC thresholds permits general dynamic selective acceleration of data through the AccAD network and the creation of virtual networks.

In the example presented by FIG. 6B, any of client1-client5 has the ability to access any of server1-server5 directly without going through the AccAD network (not illustrated). Note that available direct connections (as well as lost or newly opened connections) may affect the structure of different virtual neighborhoods and may drastically affect routing decisions based on the determined costs and MC threshold. Given each pair of client-server, a decision is made according to the costs and the MC threshold whether it is less costly to access the server directly or go through (or partially through) the AccAD network.

To further explore the use of virtual neighborhoods, it can be seen that the "bridges" between VN1 and VN2 are the connections between node4-node5 and node6-node7. An AccAD node may either: 1) forward incoming delivery traffic as-is, on to the next node, in the direction of the requestor of the service, or 2) accelerate the transmission of this data. As stated in FIG. 6A, the arrows are directional and represent an ability to pass the requested network service in the arrow's direction.

It is not mandatory that data which flows through an AccAD node is accelerated. If the data is accelerated, then the cost of passing it on, accelerated, to the next node, is necessarily lower than the cost of simply forwarding this data on as-is. This is a basic assumption for AccAD—if data can be passed on as-is without accelerating it such that it would be "less costly" than passing it on as accelerated, then don't accelerate.

In an example in which client5 would like to receive a delivery of a network service being provided by server1, as can be seen in FIG. 6B, the path for such a delivery would be: server1→node1—node4→node6→node7→client5. Since server1 and node1, node4, and node6 are in the same virtual network, then the total cost of passing un-accelerated data from server1 to node6 is lower than the MC threshold, and thus these communications are not accelerated, but rather passed as-is through these nodes, even though accelerating them may reduce the total cost of passing the data from server1 to node6. This acceleration gating effect is at least one effect of the MC threshold. Similarly, the traffic between node7 and client5 is not accelerated, specifically in this case since the client5, at its access point (in this case—node7), should receive the original data sent from the server (uncompressed, without being aware of any accelerations etc.). But even if another AccAD node (e.g., node8) was between node7 and the client5, the communications between node7 and node8 would not be accelerated as both of them are in the same virtual network. Yet, since node6 and node7 are in different virtual neighborhoods, then the communications between them would be accelerated.

An example of costs which would create such a scenario may be:
The total cost from server1 to node6 as described=7
The cost of the link between node7 and the client5=3 (though this only affects whether client5 would access server1 directly or through the AccAD network)
The cost between node6 and node7=10
The MC threshold=10.

These costs and the provided MC threshold cause server1 and node1, node4, and node6 to all be considered in the same virtual neighborhood, and likewise cause node7 and client5 to be in the same virtual neighborhood. The two virtual neighborhoods, however, are disjoint sets, as adding the cost of the link between node6 and node7 to each of them would mean passing the MC threshold of 10, thus acceleration only occurs between node6 and node7.

In another implementation, once a client-server pair requires an acceleration in any hop in the path between them inside the AccAD network, then any and/or all of the hops between each two AccAD nodes in the network path can be accelerated. This can be configured regardless of the MC threshold, even if some of the pairs of AccAD nodes are in the same virtual neighborhood. While typically network paths within the same virtual network are not accelerated, in some instances, some network paths (e.g., the longest paths) can be completely accelerated. Note that it may mean accelerating the communication between one client-server pair in a given network path, but not accelerating the communication between a different client-server pair which goes through the same network path inside the AccAD network.

In order to calculate costs in a "smart" way, for example, each AccAD node can publish the cost from it to each of its neighboring AccAD nodes (and associated client/servers) and in conjunction with available routing tables (e.g., part of AccAD data and/or repository data), each AccAD node would be able to calculate the best route for it considering the costs of the different available paths (e.g. by using Dijkstra's algorithm for shortest paths, where, for example, each network hop's weight (or other appropriate value/measurement) is its "cost"). Each AccAD node would then "know" whether its communication with another node in the network should be accelerated by AccAD functionality or not. Each AccAD node can then request accelaration from an AccAD application or to directly contact a desired destination network node (e.g., client/server or AccAD node). Between particular AccAD appliances, optimal routes for network traffic are searched for and incoming traffice redirected, by need, to other AccAD appliaances if it would improve the performance of the network. Knowledge whether to accelerate with AccAD functionality or to form a direct routing with a particular network node helps to optimize routing in the network and can reduce usage costs of network service delivery systems such as an AccAD node, especially when paying per appliance.

In some implementations, network structure can be monitored, for example by analyzing traffic which passes through the network, by communication, and/or spreading of relevant data by various AccAD appliances in order to improve the view of the overall network with respect to each such appliance, etc. In this way, the network structure can be analyzed and network neighbors identified. The monitoring/analysis can, in some implementations, provide a constantly available live view of the network's structure, which would allow optimal automatic decisions. As a result, each AccAD node would "know" which network traffic content should it accelerated and which not, and would "know" the best method of delivering this content across the network. Network and other configurations can be automatically determined and applied based on the monitoring functionality. In some implementations, the network and other configurations can be manually performed, for example by a system administrator who can set predefined configurations for sole use or configurations in conjunction with further automatic configurations.

In some implementations, one or more service delivery configurations can be automatically generated based on a particular content type being routed through the network, the source and/or destination of the content, and other parameters, including specific fine-tunings of a delivery's configurations suited according to the particular content and/or other network parameters. Services delivery configurations are relevant for any type of content which is routed, and for which routings can be adjusted. Furthermore, specific content types and/or connections and/or specific protocols can be manually/automatically defined to be ignored/not accelerated. For example, search requests can be specified to not be accelerated by the AccAD network.

In some implementations, the AccAD network can suggest how to modify the AccAD network topology in order to achieve better overall performance. Performance can be measured by parameters such as, but not limited to, costs, free bandwidth, throughput, etc. For example, modification suggestions could be to add another SFE 160 in order to improve reachability to a particular server(s), or removing a CFE 150 which sees little use and is wasting avaialble resources, money, etc. In some implementations, the AccAD application can provide functionality to suggest AccAD network modifications, including providing a user-accessible GUI to generate, remove, review, edit, propose, and/or select modifications to the AccAD network. Modification suggestions can help users save costs and/or improve the performance of network topologies by telling providing information as to where accelerator nodes can be added/removed in order to improve the performance/reduce costs.

If an AccAD acceleration through the AccAD network/virtual neighborhoods might harm/endanger data integrity, an administrator can also choose to decrease an acceleration amount and/or modify data quality preferences—such as the encryption of the data (on/off), caching data (on/off/limited), using a dictionary data structure, etc. For example, streaming video data at a particular high quality might be adversely affected if accelerated through a particular AccAD network path, although the cost may be lower. The administrator can reduce the required video quality to a level acceptable to users but not affected by the acceleration.

The best determined topology (according to cost/performance requirements) can also be calculated for comparison with other options and/or a real AccAD network configuration before any actual modifications are made in the network's topology (e.g., in a dynamic "sandbox"/simulation type of environment). Before any actual modifications are made in the AccAD network's topology, the dynamic simulation can leverage actual AccAD network parameters in current states (e.g., cost, bandwidth status, number of users, etc.). An administrator can vary parameters, including the MC threshold to dynamically build/change virtual neighborhoods to analyze effects on overall AccAD network performance and, if desired, change the topology of an AccAD network on-the-fly.

In some implementations, routes for traffic (including specific types of traffic) can be prioritized within the AccAD network. Prioritization can be based upon administrator requirements, dynamic determinations based on network status, AccAD network usage, and the like. Traffic routing can help save costs and/or improve the performance of network topologies in that for particualar content types, a more limited set and/or particular set of necessary resources can be specified which can save usage costs and improve performance. For example, for low priority traffic, particular high-cost routes (slower) can be prioritized/specified for that type of traffic to save money (e.g., by not accelerating the route). As another example, data intensive traffic (video streaming), can be priortized through network routes that are just sufficient performance-wise to meet demand without wasting additional cost for unnecessary performance.

Figure 7:
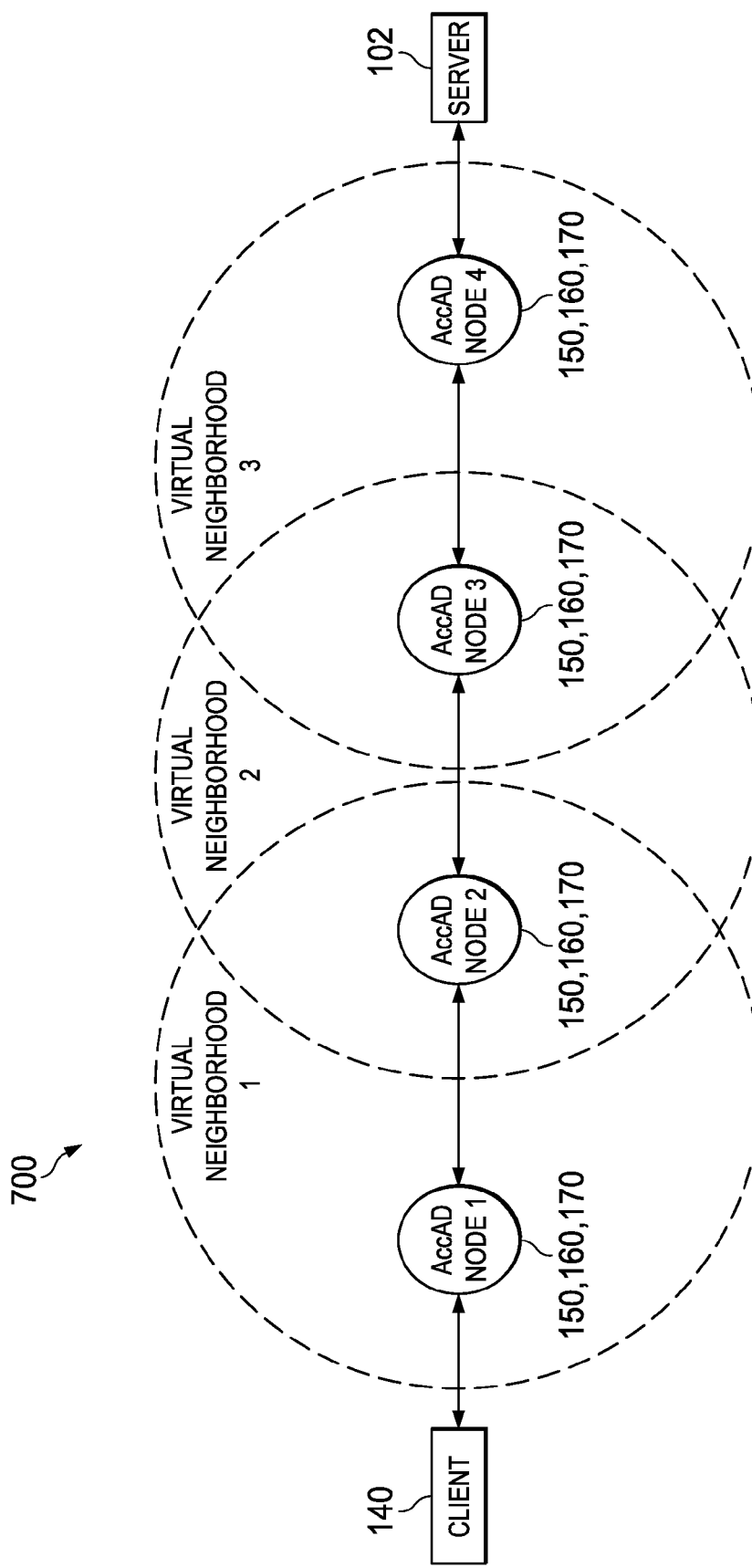
FIG. 7 is a block diagram illustrating AccAD nodes shared between multiple virtual neighborhoods according to an implementation.

FIG. 7 is a block diagram 700 illustrating AccAD nodes shared between multiple virtual neighborhoods according to an implementation. As illustrated, AccAD node1 (node1) and node2 are part of virtual neighborhood 1, node2 and node3 are part of virtual neighborhood 2, and node3 and node4 are part of virtual neighborhood 3. Note that while network traffic could be accelerated across the AccAD network defined by node1-node4, it might be less costly to traverse from client 140→node1→node3→node4. In this example, network traffic would enter the AccAD network, but node1 would then determine that it would be less costly to communication the traffic directly with node3 of virtal neighborhood 2/3 and for the traffic to be accelerated through virtual neighborhood 2/3 (node3→node4). Note that since node1 and node3 are in different virtual neighborhoods, the communications between them would also be accelerated. This is because if the cost from node1 to node3 was less than the MC threshold, then node1 and node3 would have been in the same virtual neighborhood. Another example could be that network traffic could leave server 102 and be received by node4. Node4 could then transmit the traffic to node3 in virtual neighborhoods 3/2 and node3 could then determine that it would be less costly to transmit the traffic directly to node1 for transmission to the client 140. Various other combinations of this example should be apparent to those of skill in the art.

Figure 8:
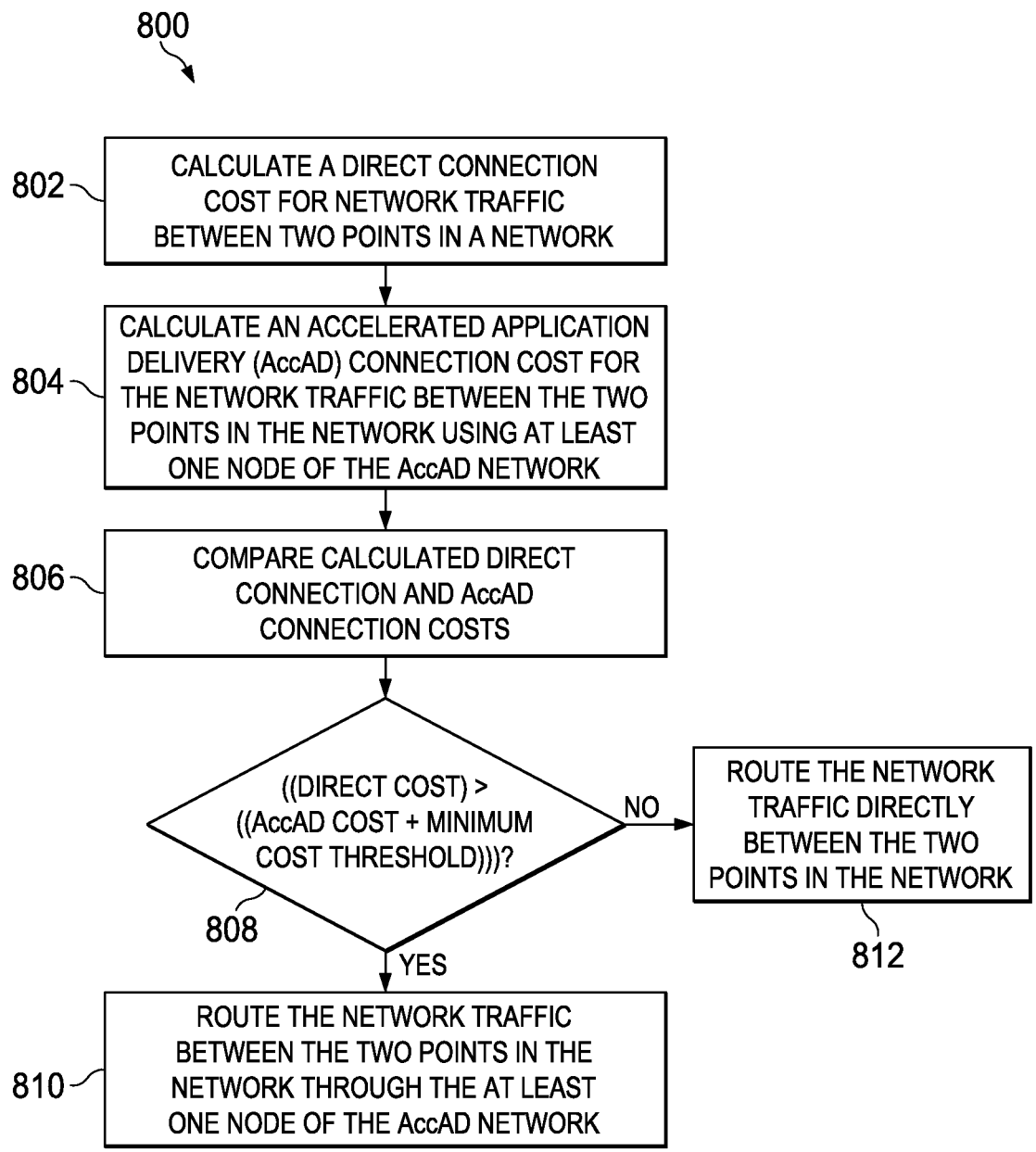
FIG. 8 is a flow chart illustrating a method for providing network traffic routing optimizations according to an implementation.

FIG. 8 is a flow chart illustrating a method for providing network traffic routing optimizations according to an implementation. For clarity of presentation, the description that follows generally describes method 800 in the context of FIGS. 1, 2A & 2B, 3, 4, 5, 6A & 6B, and 7. However, it will be understood that method 800 may be performed, for example, by any other suitable system, environment, software, and hardware, or a combination of systems, environments, software, and hardware as appropriate. In some implementations, various steps of method 800 can be run in parallel, in combination, in loops, or in any order.

At 802, a direct connection cost is calculated for network traffic between two points in a network, the network including one or more nodes of an accelerated application delivery (AccAD) network. In some implementations, the connection cost can include consideration of at least one of bandwidth, latency, a network hop count, a number of network links between the two points, CPU usage, memory usage, disk space usage, a quality-of-service (QoS) value, a round trip time (RTT) value, a network congestion value, an amount of network traffic, a number of network connections, network connection interval length, a traffic type, preference tables, or physical destination. In some implementations, the AccAD network is divided into at least two virtual neighborhoods. In some implementations, the network traffic between AccAD network nodes in a virtual neighborhood is not accelerated. In some implementations, the network traffic between virtual neighborhoods is accelerated. In some implementations, once an acceleration of another network link between any two AccAD network nodes is required, at least one network link between the AccAD network nodes is accelerated. In some implementations, the acceleration of any network link between the AccAD network nodes is performed regardless of the minimum cost threshold value and/or whether the AccAD network nodes are in the same virtual neighborhood or not. From 802, method 800 proceeds to 804.

At 804, an AccAD connection cost is calculated for the network traffic between the two points in the network using at least one node of the AccAD network. From 804, method 800 proceeds to 806.

At 806, the calculated direct connection cost and the AccAD connection cost are compared. From 806, method 800 proceeds to 808.

At 808, a determination is made whether the direct connection cost is greater than the sum of the AccAD connection cost and a minimum cost threshold value. If the direct connection cost is greater than the sum of the AccAD connection cost and a minimum cost threshold value, method 800 proceeds to 810. If the direct connection cost is less than or equal to the sum of the AccAD connection cost and a minimum cost threshold value, method 800 proceeds to 812.

At 810, the network traffic is routed between the two points in the network through the at least one node of the AccAD network. From 810, method 800 stops.

At 812, the network traffic is routed directly between the two network points. From 812, method 800 stops.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/–R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
    calculating a direct connection cost for network traffic between two points in a network, the network including one or more nodes of an accelerated application delivery (AccAD) network;
    calculating an AccAD connection cost for the network traffic between the two points in the network using at least one node of the AccAD network;
    comparing the calculated direct connection cost and the AccAD connection cost; and
    determining whether the direct connection cost is greater than the sum of the AccAD connection cost and a minimum cost threshold value, wherein the minimum cost threshold value is added to the AccAD connection cost to generate at least one virtual neighborhood of AccAD network nodes and to prevent accelerated application delivery within the at least one virtual neighborhood by restricting accelerated application delivery to between only the most costly paths through the AccAD network.

2. The method of claim 1, wherein connection cost can include consideration of at least one of bandwidth, latency, a network hop count, a number of network links between the two points, CPU usage, memory usage, disk space usage, a quality-of-service (QoS) value, a round trip time (RTT) value, a network congestion value, an amount of network traffic, a number of network connections, network connection interval length, a traffic type, preference tables, or physical destination.

3. The method of claim 1, comprising routing the network traffic directly between the two network points if the direct connection cost is less than or equal to the sum of the AccAD connection cost and the minimum cost threshold value.

4. The method of claim 1, comprising routing the network traffic between the two points in the network through the at least one node of the AccAD network if the direct connection cost is greater than the sum of the AccAD connection cost and the minimum cost threshold value.

5. The method of claim 1, wherein the AccAD network is divided into at least two virtual neighborhoods.

6. The method of claim 5, wherein network traffic between AccAD network nodes in a virtual neighborhood is not accelerated.

7. The method of claim 5, wherein network traffic between virtual neighborhoods is accelerated.

8. The method of claim 5, comprising accelerating at least one network link between the AccAD network nodes once an acceleration of another network link between any two AccAD network nodes is required.

9. The method of claim 8, wherein the acceleration of the at least one network link between the AccAD network nodes is performed regardless of the minimum cost threshold value and an association of the AccAD network nodes to one or more virtual neighborhoods.

10. A non-transitory, computer-readable medium storing computer-readable instructions executable by a computer and operable to:
    calculate a direct connection cost for network traffic between two points in a network, the network including one or more nodes of an accelerated application delivery (AccAD) network;
    calculate an AccAD connection cost for the network traffic between the two points in the network using at least one node of the AccAD network;
    compare the calculated direct connection cost and the AccAD connection cost; and
    determine whether the direct connection cost is greater than the sum of the AccAD connection cost and a minimum cost threshold value, wherein the minimum cost threshold value is added to the AccAD connection cost to generate at least one virtual neighborhood of AccAD network nodes and to prevent accelerated application delivery within the at least one virtual neighborhood by restricting accelerated application delivery to between only the most costly paths through the AccAD network.

11. The medium of claim 10, wherein connection cost can include consideration of at least one of bandwidth, latency, a network hop count, a number of network links between the two points, CPU usage, memory usage, disk space usage, a quality-of-service (QoS) value, a round trip time (RTT) value, a network congestion value, an amount of network traffic, a number of network connections, network connection interval length, a traffic type, preference tables, or physical destination.

12. The medium of claim 10, comprising instructions to route the network traffic directly between the two network points if the direct connection cost is less than or equal to the sum of the AccAD connection cost and the minimum cost threshold value.

13. The medium of claim 10, comprising instructions to route the network traffic between the two points in the network through the at least one node of the AccAD network if the direct connection cost is greater than the sum of the AccAD connection cost and the minimum cost threshold value.

14. The medium of claim 10, wherein the AccAD network is divided into at least two virtual neighborhoods.

15. The medium of claim 14, wherein network traffic between AccAD network nodes in a virtual neighborhood is not accelerated.

16. The medium of claim 14, wherein network traffic between virtual neighborhoods is accelerated.

17. The medium of claim 14, comprising instructions to accelerate at least one network link between the AccAD network nodes once an acceleration of another network link between any two AccAD network nodes is required.

18. The medium of claim 17, wherein the acceleration of the at least one network link between the AccAD network nodes is performed regardless of the minimum cost threshold value and an association of the AccAD network nodes to one or more virtual neighborhoods.

19. A system, comprising:
    a memory configured to contain at least one node of an accelerated application delivery (AccAD) network; at least one computer interoperably coupled with the memory and configured to:

calculate a direct connection cost for network traffic between two points in a network, the network including one or more nodes of the AccAD network;

calculate an AccAD connection cost for the network traffic between the two points in the network using at least one node of the AccAD network;

compare the calculated direct connection cost and the AccAD connection cost; and determine whether the direct connection cost is greater than the sum of the AccAD connection cost and a minimum cost threshold value, wherein the minimum cost threshold value is added to the AccAD connection cost to generate at least one virtual neighborhood of AccAD network nodes and to prevent accelerated application delivery within the at least one virtual neighborhood by restricting accelerated application delivery to between only the most costly paths through the AccAD network.

20. The system of claim 19, wherein connection cost can include consideration of at least one of bandwidth, latency, a network hop count, a number of network links between the two points, CPU usage, memory usage, disk space usage, a quality-of-service (QoS) value, a round trip time (RTT) value, a network congestion value, an amount of network traffic, a number of network connections, network connection interval length, a traffic type, preference tables, or physical destination.

21. The system of claim 19, configured to route the network traffic directly between the two network points if the direct connection cost is less than or equal to the sum of the AccAD connection cost and the minimum cost threshold value.

22. The system of claim 19, configured to route the network traffic between the two points in the network through the at least one node of the AccAD network if the direct connection cost is greater than the sum of the AccAD connection cost and the minimum cost threshold value.

23. The system of claim 19, wherein the AccAD network is divided into at least two virtual neighborhoods.

24. The system of claim 23, wherein network traffic between AccAD network nodes in a virtual neighborhood is not accelerated.

25. The system of claim 23, wherein network traffic between virtual neighborhoods is accelerated.

26. The system of claim 23, configured to accelerate at least one network link between the AccAD network nodes once an acceleration of another network link between any two AccAD network nodes is required.

27. The system of claim 26, wherein the acceleration of the at least one network link between the AccAD network nodes is performed regardless of the minimum cost threshold value and an association of the AccAD network nodes to one or more virtual neighborhoods.

* * * * *